United States Patent
Read et al.

[11] Patent Number: 6,093,231
[45] Date of Patent: Jul. 25, 2000

[54] AIR/OIL SEPARATOR WITH UNITARY TOP END CAP AND FLANGE

[75] Inventors: Brian Read, Stow; Staffan B. Linnersten, Broadview Heights, both of Ohio

[73] Assignee: Air-Maze Corporation, Stow, Ohio

[21] Appl. No.: 09/174,139

[22] Filed: Oct. 16, 1998

[51] Int. Cl.$^7$ .................................................. B01D 35/30
[52] U.S. Cl. .............................. 55/498; 55/502; 55/508; 55/510; 55/521; 55/DIG. 5
[58] Field of Search .............................. 55/486, 497, 498, 55/502, 508, 510, 521, DIG. 5, DIG. 17; 210/493.2, 493.5

[56] References Cited

U.S. PATENT DOCUMENTS

| | | | |
|---|---|---|---|
| 3,077,716 | 2/1963 | Wilson | 55/510 X |
| 4,233,042 | 11/1980 | Tao | 55/498 X |
| 4,349,363 | 9/1982 | Patel et al. | 55/498 |
| 4,634,527 | 1/1987 | Marshall | 55/502 X |
| 4,765,811 | 8/1988 | Beckon | 55/498 |
| 5,207,811 | 5/1993 | Buonpastore | 55/508 X |
| 5,250,179 | 10/1993 | Spearman | 210/493.2 X |
| 5,605,555 | 2/1997 | Patel et al. | 55/DIG. 5 |
| 5,669,949 | 9/1997 | Dudrey et al. | 55/498 X |

*Primary Examiner*—Richard L. Chiesa
*Attorney, Agent, or Firm*—Rankin, Hill, Porter & Clark LLP

[57] ABSTRACT

An air/oil separator has a filter media pack arranged radially symmetrically about an axis. A bottom end cap is secured to one end of the filter media pack. A top end cap and flange assembly includes a flange and trough member having a flange portion extending radially outwardly from the axis providing a flange for mounting the separator such that the separator is suspended from the flange portion. The flange and trough member also has a trough portion providing an inverted trough within which is a hardenable material secured to the other end of the filter media pack. The flange and trough member is a single unitary member forming both flange and the trough, which eliminates separate flange and trough members which must be welded or brazed together.

4 Claims, 2 Drawing Sheets

AIR/OIL SEPARATOR WITH UNITARY TOP END CAP AND FLANGE

BACKGROUND OF THE INVENTION

1. Field of the Invention

This invention relates to air/oil separators, and more particularly to the construction of the radially outwardly extending mounting flange on such separators.

2. Description of the Prior Art

Air/oil separators are typically used where it is necessary to remove suspended oil mist from an air stream, such as in the exhaust systems of air compressors. The separator allows the exhausted air to be used without the contamination of the oil which has entered the air in the compressor, and provides for the recovery of the oil so that it can be reused. The separator uses a filter media pack through which the air flows and in which the oil coalesces. The separator is mounted in a separation chamber of an oil reservoir tank and is designed to be replaceable, so that the separator can be removed and replaced with a clean separator when the separator becomes dirty or contaminated through use. In most prior art designs of air/oil separators, the shape of the separator is generally radially symmetrical about a central axis, and the separator is mounted so as to be suspended within the separation chamber. The contaminated air usually enters the separation chamber and flows into the center of the air/oil separator where it then flows axially out of the separation chamber. As the air flows radially through the layers of the separator, the oil coalesces and collects on the outside of the separator where it drains into a reservoir. The flow directions may also be reversed in which contaminated air is introduced into the center of the air/oil separator and flows radially outwardly through the layers of the separator with the oil coalescing and collecting on the bottom of the separator, where it can be syphoned off or drained into the reservoir.

An example of a prior art air/oil separator is shown in U.S. Pat. No. 5,605,555, issued to Patel et al. The filter media pack has been typically made of pleated layers of a filter media, formed into a cylinder or other suitable radially symmetrical shape. The filter media pack has been retained in place by end caps mounted onto each. Since the separator was suspended from the top end cap, the top end cap required a rigid metal support in the form of a circular member formed in an inverted trough within which a potting compound was molded with the top end of the filter media pack secured in the compound and held thereby. The separator was mounted in the separation chamber by means of a mounting flange which extended radially outwardly from the top end cap of the separator. The outward end of the flange was captured within two portions of the tank and the inward end was attached to the top end cap, so that the separator was suspended in the separation chamber. Specifically, this mounting flange was typically welded or brazed or otherwise connected to the circular trough member of the top end cap.

While this prior art air/oil separator design operated in a suitable manner, it has always been desirable to make the separators as efficiently as possible and to minimize the steps in the manufacturing operation.

SUMMARY OF THE INVENTION

The present invention provides a unique design for an air/oil separator which minimizes the manufacturing steps in the fabrication of the separator, permits the separator to be made less expensively, provides for more reliable mounting of the separator in the separation chamber, and provides other advantages that have not been realized heretofore.

In accordance with the present invention, the trough end cap member of the prior art air/oil separator is eliminated and replaced by an extension of the flange member, so that the potting compound for the top end cap is formed directly within a trough formed by the flange member. The separate welding or brazing of the flange to the trough member is eliminated. Furthermore, since the flange and trough are of unitary construction, there is no joint between the flange and the trough member which is subject to failure, and the mounting of the separator is more reliable.

These and other advantages are provided by the present invention of an air/oil separator comprising a filter media pack arranged radially symmetrically about an axis. A bottom end cap is secured to one end of the filter media pack. A top end cap and flange assembly comprises a flange and trough member having a flange portion extending radially outwardly from the axis providing a flange for mounting the separator such that the separator is suspended from the flange portion. The flange and trough member also has a trough portion providing an inverted trough within which is a hardenable material secured to the other end of the filter media pack. The flange and trough member is a single unitary member forming both flange and the trough.

DETAILED DESCRIPTION OF THE PREFERRED EMBODIMENT

Figure 1:
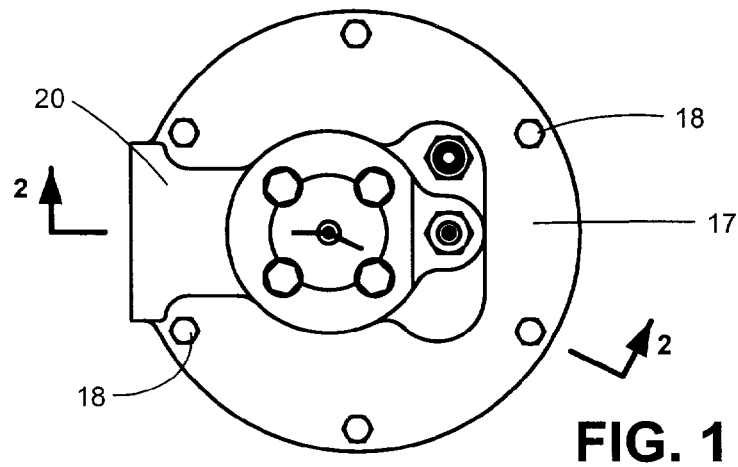
FIG. 1 is a top plan view of a oil reservoir tank for use with the present invention.
Figure 2:
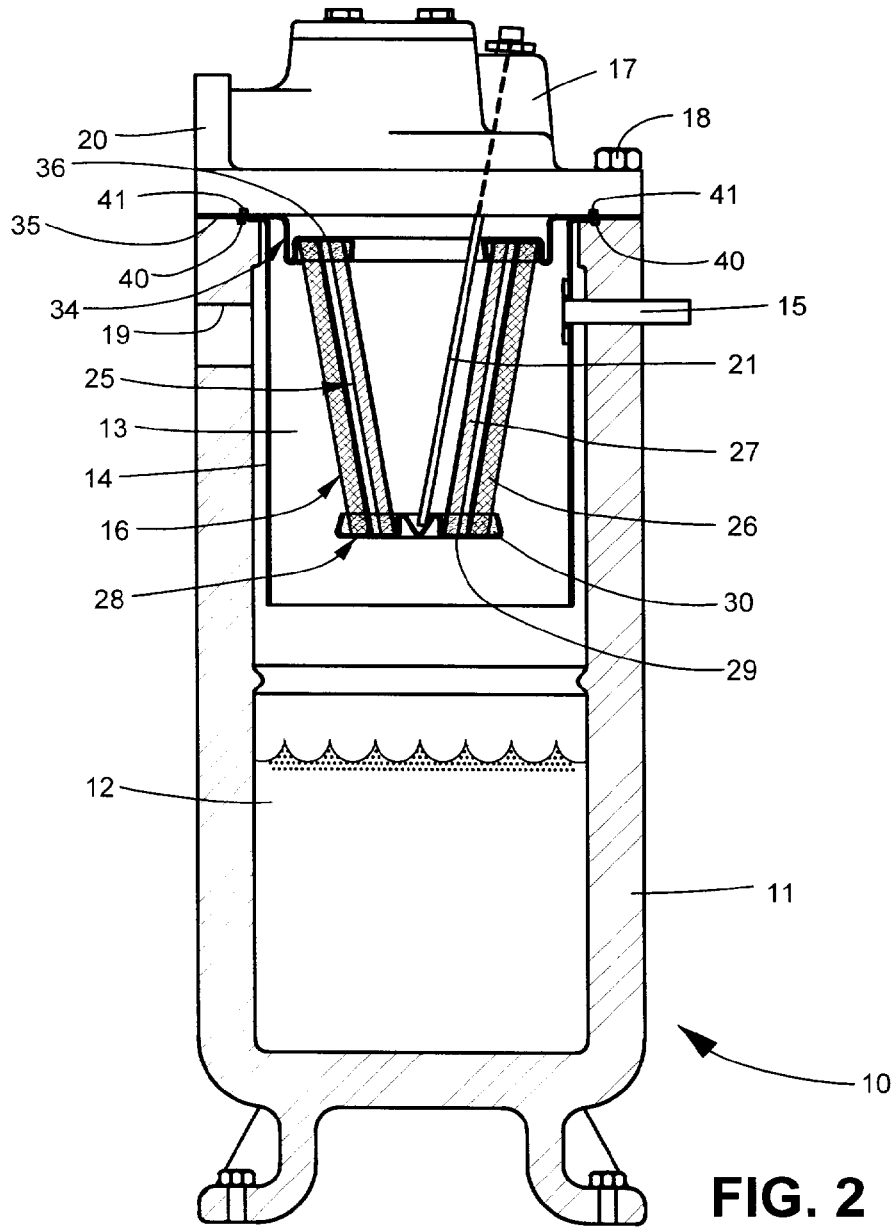
FIG. 2 is side sectional view taken along line 2—2 of FIG. 1 showing the tank with the air/oil separator of the present invention.
Figure 3:
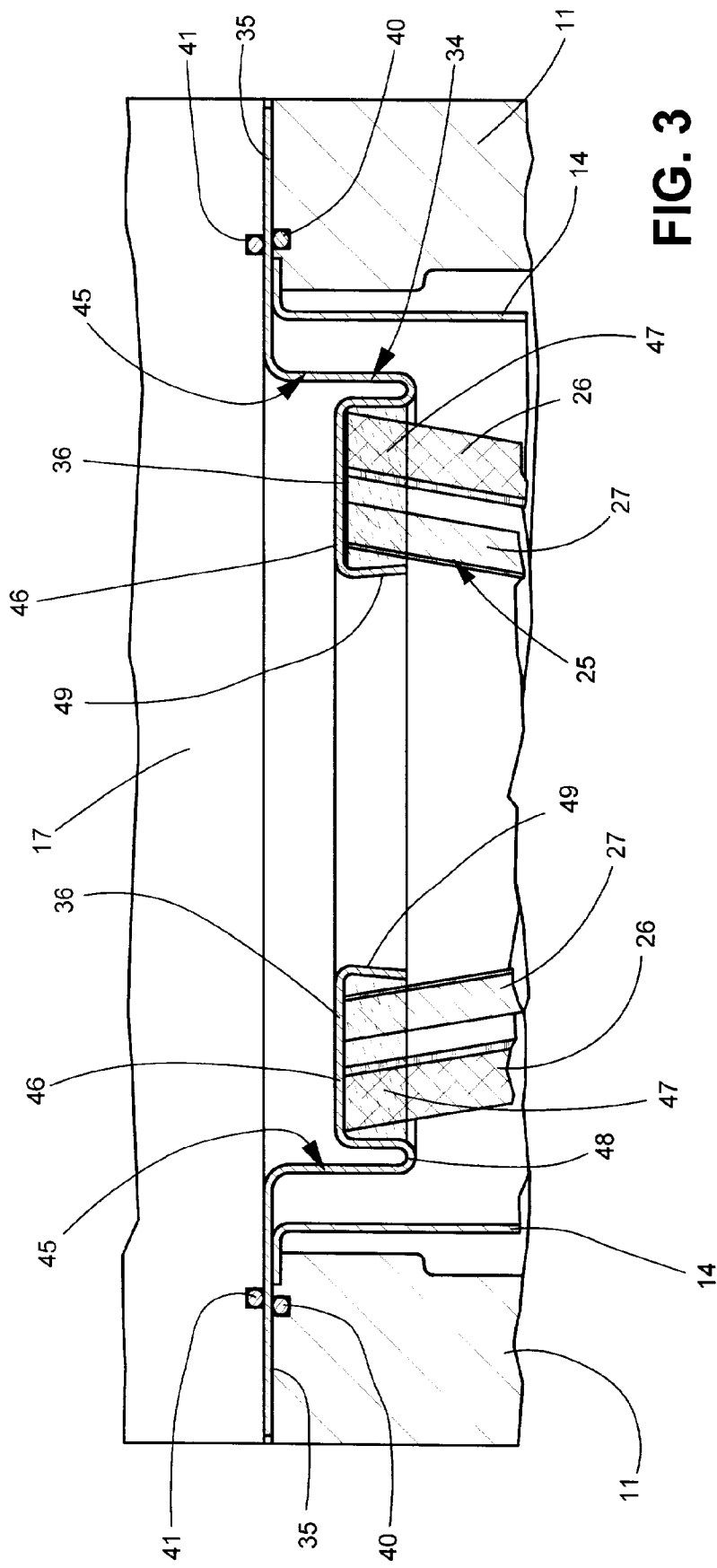
FIG. 3 is detailed side sectional view of a portion of FIG. 2 showing the top cap and flange assembly of the separator.

Referring more particularly to the drawings and initially to FIGS. 1 and 2, there is shown a oil tank 10 for use in the present invention. The tank shown and described herein is only one of many arrangements in which the present invention may be used, and the tank and separation configuration may be altered significantly without affecting the present invention. The pre-separated tank 10 comprises a body 11 having a reservoir 12 formed at the bottom for collection of separated oil. The upper portion of the body 11 forms a separation chamber 13 within which a shroud 14 is provided. A safety valve 15 extends from within the shroud through the side wall of the tank body 11. An air/oil separator 16 is mounted in the separation chamber 13 within the shroud 14. The tank cover 17 is mounted to the top of the body 11 by bolts 18 or other suitable fastening devices. An air inlet 19 is formed on one side of the body 11 through which air enters the separation chamber 13. The air passes through the separator 16 and leaves the separation chamber 13 through an air outlet 20 formed in the tank cover 17. The oil coalesces on the interior of the separator 16 and drains into the bottom of the separator interior where it is removed through a scavenging tube 21 which extends downwardly from the tank cover 17 into the separator.

The separator 16 comprises a filter media pack 25 having a desirable axially symmetrical shape. Preferably, the media pack 25 is conical or frustoconical in shape, as shown in FIG. 2, but the media pack may also be made in a conventional cylindrical shape if desired, or any other desirable axially symmetrical shape. The media pack 25 may be comprised of any suitable combination of filtering elements, such as fiberglass, polyester, polypropylene or metal, some of which may be pleaded in a conventional manner, or which may be molded, wrapped or otherwise shaped. In the preferred form shown, the media pack comprises two different stage layers, a coalescing stage layer 26 and a drain stage layer 27, with the drain stage layer mounted on the downstream side of the coalescing stage layer. The filter media pack 25 also preferably includes an outer wrap layer on the exterior of the filter media pack, and a support member along the interior surface of the filter media pack. The filter media pack 25 is held in place at each end by end caps. The bottom end cap 28 is generally circular, and may be formed of a metal retaining member 29. The outer circumferential portion of the retaining member 29 is formed into a U-shaped channel or trough within which the bottom end of the media pack 25 is set in a hardenable sealant material 30, such as foamed urethane. The material 30 seals the media pack 25 to the bottom of member 29 and prevents fluid from flowing into or out of the interior of the separator, except through the media pack.

At the top of the separator 16 is a unitary top end cap and flange assembly 34 which by itself comprises a flange portion 35 and an end cap portion 36. The top end of the filter media pack 25 is held in position by being set in hardenable sealant material held within in the top end cap portion 36, as explained in more detail below.

The separator 16 is mounted in the separation chamber 13 by being suspended from the flange portion 35 which extends radially outwardly from the separator at the top of the separator. The outward periphery of the flange portion 35 is captured between the top rim of the tank body 11 and the bottom of the tank cover 17. Sealing means are preferably provided to seal the tank cover 17 to the top of the body 11 with the outer circumferential periphery of the flange portion 35 between them. Preferably, these sealing means comprise a pair of O-rings 40 and 41 One 40 of the O-rings is provided a corresponding groove on the top rim of the tank body 11, and the other 41 of the O-rings is provided in a corresponding groove around the periphery of the bottom of the tank cover 17. Instead of the O-rings 40 and 41 a flat gasket may be provided between the top rim of the tank body 11 and bottom of the tank cover 17.

The top end cap and flange assembly 34 is shown in more detail in FIG. 2. It comprises a flange and trough member 45 which is preferably made of metal, such as stainless steel or plated steel or aluminum. The member 45 comprises the flange portion 35 which extends radially outwardly and is used to mount the separator in the separation chamber 13, and a trough portion 46 which forms part of the top end cap portion 36. The trough portion 46 is formed in an inverted U-shaped channel or trough which is filled with the hardenable sealant material or potting compound 47, such as foamed urethane, epoxy, plastisol or other suitable material. Similar to the material 30, the material 47 seals the media pack 25 to the top assembly 34 and prevents fluid from flowing into or out of the interior of the separator, except through the media pack. Between the flange portion 35 and the trough portion 46 is a transition portion 48 where the member 45 is formed with a ridge extending downwardly. The inner portion of this ridge forms the outer wall of the trough. The inner wall 49 of the trough is formed so that it tilts inwardly from vertical; this assures that the potting compound 47 is securely held within the trough as the separator is supported and suspended from the member 45. Preferably, the inner wall 49 forms an angle of 5° with the vertical axis.

While the separator 16 shown in FIG. 2 is shown mounted below the level of the flange portion 35 such that the flange portion extends above the top level of the rest of the separator, this is only one possible configuration of the separator of the present invention designed to replace prior art separators having similar configurations. It should be understood that the flange portion could also extend horizontally outwardly in the same general plane as the top of the trough portion, or in any other configuration as desired. Similarly, while the transition portion 48 is shown as sharply formed ridge with both axially circumferentially extending sides generally vertically, it should be understood that either or both sides of the transition portion may slanted relative to vertical as desired.

In the fabrication of the separator 16 of the present invention, the filter media pack 25 is formed in accordance with conventional techniques. The bottom end cap 28 is formed by positioning the bottom end of the media pack 25 within the trough formed by the bottom retainer member 29 using a suitable jig, and filling the trough with the potting compound 30 to secure the bottom end cap in place and hold the bottom end of the media pack in position. The unitary top end cap and flange assembly 34 is then formed using the flange and trough member 45 which is prefabricated using a suitable metal forming operation, such as a stamping press. The member 45 is inverted so that its trough is open upwardly, and the partial assembly of the media pack 25 and the attached bottom end cap 28 is inverted so that the top end of the filter media pack is positioned in the trough portion 46 of the member 45 using another suitable jig. The trough portion 46 is then filled with the potting compound 47, which is allowed to cure and harden, securing the top end of the filter layers 26 and 26 in trough portion 46. The fabrication of the separator 16 is thus completed without the necessity of separately attaching the flange to the end cap.

The separator 16 is installed in the tank 10 in a conventional manner, by removing the bolts 18 to allow the tank cover 17 to be removed from the tank body 11, and placing the separator 16 into the separation chamber 13 with the flange portion 35 extending over the top rim of the tank body. The tank cover 17 is then replaced, the outer periphery of the flange portion 35 being trapped between the top rim of the tank body 11 and the outer periphery of the bottom of the tank cover, and the tank cover is secured to the body using the bolts 18. The separator is then held in the separation chamber 13, suspended from the flange portion 35. There is no fabricated joint between the flange and the end cap which is subject to fail, so the separator is held more securely. Because the inner wall 49 of the trough portion is slanted inwardly, the potting compound in which the upper end of the media pack 25 is embedded, is held securely in the trough which is an integral part of the unitary top end cap and flange assembly 34. While the air/oil separator of this invention has been described with reference to an outside-in air flow in the oil tank having an outside-in air flow, it should be understood that the separator provides equal advantages when the air is flowing the opposite direction. Instead of air entering the oil tank 10 through the inlet 19 and exiting through the outlet 20, the air flow may be reversed with the air entering the oil tank through the passage 20 and exiting through the passage 19. The air/oil separator provides the same advantages under these circumstances.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. An air/oil separator comprising:
   a filter media pack, arranged radially symmetrically about an axis;
   a bottom end cap secured to one end of the filter media pack; and
   a top end cap and flange assembly comprising a flange and trough member having a flange portion extending radially outwardly from the axis for mounting the separator such that the separator is suspended from the flange portion, the flange and trough member also having a trough portion providing an inverted trough within which is a hardenable material secured to the other end of the filter media pack, the flange and trough member being a single unitary member bent to form both flange and the trough.

2. An air/oil separator as in claim 1, wherein the flange and trough member includes a transition portion which includes a ridge extending downwardly.

3. An air/oil separator as in claim 2, wherein the transition portion forms one side wall of the inverted trough of the trough portion.

4. An air/oil separator as in claim 1, wherein the inverted trough has at least one side wall which is tapered inwardly to secure the hardenable material in the trough.

* * * * *